(12) United States Patent
Uhlik

(10) Patent No.: US 11,506,408 B2
(45) Date of Patent: Nov. 22, 2022

(54) MODULAR ROOM-AIR TREATMENT SYSTEM

(71) Applicant: Christian Uhlik Unternehmensberatung, Kumhausen (DE)

(72) Inventor: Christian Uhlik, Kumhausen (DE)

(73) Assignee: CHRISTIAN UHLIK UNTERNEHMENSBERATUNG, Kumhausen (DE)

(*) Notice: Subject to any disclaimer, the term of this patent is extended or adjusted under 35 U.S.C. 154(b) by 91 days.

(21) Appl. No.: 16/576,089

(22) Filed: Sep. 19, 2019

(65) Prior Publication Data

US 2020/0096216 A1 Mar. 26, 2020

(30) Foreign Application Priority Data

Sep. 21, 2018 (DE) .................. 10 2018 123 327.2
Jan. 31, 2019 (DE) .................. 20 2019 100 593.9

(51) Int. Cl.
| | |
|---|---|
| *F24F 11/30* | (2018.01) |
| *F24F 11/56* | (2018.01) |
| *F24F 1/02* | (2019.01) |
| *F24F 3/14* | (2006.01) |
| *F24F 8/10* | (2021.01) |

(52) U.S. Cl.
CPC .............. *F24F 11/30* (2018.01); *F24F 1/02* (2013.01); *F24F 3/14* (2013.01); *F24F 8/10* (2021.01); *F24F 11/56* (2018.01)

(58) Field of Classification Search
CPC .... F24F 11/30; F24F 8/10; F24F 11/56; F24F 1/02; F24F 3/14; F24F 2221/36; F24F 11/89; F24F 13/20; F24F 13/32; F24F 11/77; F24F 13/28; F24F 8/108; F24H 3/0411; Y02B 30/70
See application file for complete search history.

(56) References Cited

U.S. PATENT DOCUMENTS

| | | | |
|---|---|---|---|
| 2,725,729 A | * 12/1955 | Mills ................... | F24F 1/0007 |
| | | | 62/310 |
| 9,719,688 B2 | * 8/2017 | Holloway ............. | F28D 20/021 |

(Continued)

FOREIGN PATENT DOCUMENTS

| | | |
|---|---|---|
| CN | 1752617 A | 3/2006 |
| CN | 205783647 U | * 12/2016 |

(Continued)

OTHER PUBLICATIONS

Wagner, Building's Room Air Conditioning Device . . . , Aug. 2, 2007, DE102006004104A1, Whole Document (Year: 2007).*

(Continued)

*Primary Examiner* — Larry L Furdge
(74) *Attorney, Agent, or Firm* — Christopher A. Rothe; Culhane Meadows, PLLC

(57) ABSTRACT

A room-air treatment system includes a basic module that has a first air-treatment unit and a control device for controlling the first air-treatment unit. The room-air treatment system includes at least one second air-treatment unit that can be coupled to the basic module, in particular the first air-treatment unit. The control device controls both the first air-treatment unit as well as the at least one second air-treatment unit.

10 Claims, 6 Drawing Sheets

(56) References Cited

U.S. PATENT DOCUMENTS

2009/0098641 A1* 4/2009 Grant .................... C12M 29/06
435/286.1
2010/0307178 A1* 12/2010 Hansen .................... F24F 1/04
62/132

FOREIGN PATENT DOCUMENTS

| CN | 205783647 U | 12/2016 |
|----|---|---|
| DE | 102006004104 A1 | 8/2007 |
| DE | 102010042950 A1 | 4/2012 |
| DE | 102011101406 A1 | 11/2012 |
| EP | 2476968 A1 | 7/2012 |
| EP | 3150926 A1 | 4/2017 |
| JP | 04121547 A | 4/1992 |
| JP | 09210429 A | 8/1997 |
| JP | 2000130819 A | 5/2000 |

OTHER PUBLICATIONS

Cao, A Module that can Superpose with can Superimposed Air Purifier for Air Purifier, Dec. 7, 2016, CN205783647U, Whole Document (Year: 2016).*

German Search Report for German Application No. 10 2018 123 327.2, with English translation, dated Jun. 27, 2019, 13 pages.

Office Action received in Chinese Application No. 201910837429.9 dated Apr. 21, 2022, with translation, 12 pages.

* cited by examiner

MODULAR ROOM-AIR TREATMENT SYSTEM

CROSS REFERENCE TO RELATED APPLICATIONS

This application claims the benefit of priority under 35 U.S.C. § 119 of German Application No. 10 2018 123 327.2, filed Sep. 21, 2018, and German Utility Model Application No. 20 2019 100 593.9, filed Jan. 31, 2019, the contents of both applications being incorporated by reference herein in their entireties.

FIELD

The present disclosure relates to a room-air treatment system for improving room-air quality in closed and open rooms.

BACKGROUND

In general, room-air quality can be assessed based on environmental parameters such as temperature and humidity as well as particulate matter levels and odor levels. In order to improve the environmental parameters, air-conditioning units with integrated humidification functionality are usually used. In order to minimize particulate-matter levels and odor levels, filtration systems containing different types of filters are used. One problem with conventional room-air treatment units are the limited possibilities to increase the treatment capacity of the system for different room sizes.

CN 1752617 A therefore discloses an air filter with a modular design, in which identical air filter units can be arranged on top of each other during operation in order to easily adapt the treatment capacity to the room size via the number of air filter units used. However, with this system the room air can only be filtered and the system offers no functionality for temperature adjustment or humidification.

A combination of air conditioners and filtration systems in one system is disclosed in EP 2 476 968 B1. A large number of air-treatment units are used together in an air treatment device, wherein the individual air-treatment units each comprise at least a component for air purification or air filtering, heating, dehumidification, humidification, and air cooling, and are connected to each other via connecting components, in particular a transmitter and a receiver. The additional installation of the transmitter as well as the receiver leads to an increase in complexity of the system due to the increasing number of components and thus to an increase in manufacturing costs.

SUMMARY

It is therefore the object of the present disclosure to provide a modular room-air treatment system, which makes it possible to overcome the disadvantages described above while simultaneously improving room-air quality.

According to the present disclosure, the room-air treatment system includes a basic module, which has a first air-treatment unit and a control device for controlling the first air-treatment unit. According to the invention, at least one second air-treatment unit is provided which can be coupled to the basic module, in particular to the first air-treatment unit, wherein the control device controls both the first air-treatment unit as well as the at least one second air-treatment unit. Due to the modular design and the possibility of controlling the first air-treatment unit and the at least one second air-treatment unit via the control device of the basic module, an additional control device for every second air-treatment unit can be dispensed with or respectively saved, which prevents the increase in the number of parts and the complexity of the system.

Furthermore, the control device can control the at least one second air-treatment unit indirectly via the first air-treatment unit. The control device for combined control of the first air-treatment unit and the at least one second air-treatment unit again prevents the increase in the number of parts as well as the complexity of the system and production costs.

In a further embodiment, a treatment capacity of the room-air treatment system can be adjusted via a number of the second air-treatment units. The modular design of the room-air treatment system according to the present disclosure allows an easy adjustment of the treatment capacity to different room sizes or room geometries. In order to increase the treatment capacity, merely the number of second air-treatment units needs to be increased. Thus, an additional increase in the complexity of the system and the number of parts can be avoided, since the adjustment of the treatment capacity does not have to be carried out via the rotational speed of a fan wheel and therefore no additional stepper motors have to be provided in the first air-treatment unit and the at least one second air-treatment unit to adjust the rotational speed of the fan wheel.

Alternatively, the treatment capacity of the room-air treatment system according to the invention can also be adjusted via a fan performance of the first air-treatment unit and the at least one air-treatment unit. In a first operating mode, the fan performance can be set directly by a user via an interface unit connected to the control device (mechanically, electrically or in another way). In a second operating mode, the fan performance can be adjusted by the control device based on a comparison of a target value of a room-air parameter entered via the interface unit and an actual value of the room-air parameter determined via a sensor. When the room-air treatment system offers the possibility to set the treatment capacity via the fan performance of the air-treatment units, the treatment capacity can be adjusted exactly even for very small room sizes.

The room-air treatment system according to the invention can also be configured in such a way that the first air-treatment unit and the at least one second air-treatment unit comprise at least one component for filtering, cooling or humidifying the ambient air. By providing the first air-treatment unit and the at least one second air-treatment unit, improvement of the room-air quality can be adequately guaranteed for different requirements, e.g. too dry air, too warm air or the like.

With the room-air treatment system according to the invention, the control device can be integrated into the first air-treatment unit. When the control device is integrated into the first air-treatment unit, no additional mechanical coupling mechanism needs to be provided between the first air-treatment unit and the control device, and the number of parts, and thus the complexity of the system as well as the manufacturing costs can be reduced.

Furthermore, the control device can be integrated into a separate control unit that can be coupled with at least one of the first air-treatment unit and/or the second air-treatment unit. It is conceivable that the separate control unit is formed as a socket unit functioning as a pedestal for a room-air treatment system according to the invention. Alternatively, however, it is also conceivable to integrate the separate control unit into a lid unit arranged at a top side of the at least one second air-treatment unit. Certainly, the separate control unit can be interposed between the first air-treatment unit and the second air-treatment unit or between two of the second air-treatment units and coupled with the respective air-treatment units. When the control device is outsourced to the separate control unit that can be coupled to the first air-treatment unit and/or the second air-treatment unit, the first air-treatment unit and the at least one second air-treatment unit can be designed identically and interchangeably, thus preventing an increase in complexity of the system.

Coupling elements for (mechanical and/or electrical) coupling of the first air-treatment unit to the at least one second air-treatment unit and coupling elements for (mechanical and/or electrical) coupling of a second air-treatment unit to a further second air-treatment unit as well as coupling elements for (mechanical and/or electrical) coupling of the first air-treatment unit to the base unit can be designed symmetrically according to the invention. An alignment of individual air-treatment units can thus be varied in a coupled state, which enables a better distribution of the treated ambient air in the room.

Furthermore, the room-air treatment system according to the invention can be equipped with a power supply unit, which can be coupled with the basic module, the first air-treatment unit, and/or the at least one second air-treatment unit to supply power to individual or all units of the room-air treatment system. The power supply unit may have solar cells on at least one of its outer surface sides. According to the invention, decoupling of the air-treatment unit and the power supply unit allows a further reduction of the number of parts of the air-treatment units and thus a further reduction of the complexity of the system as well as the manufacturing costs.

BRIEF DESCRIPTION OF THE DRAWING FIGURES

DETAILED DESCRIPTION

Embodiments of the present disclosure are described below based on the corresponding figures.

First Embodiment

Figure 1:
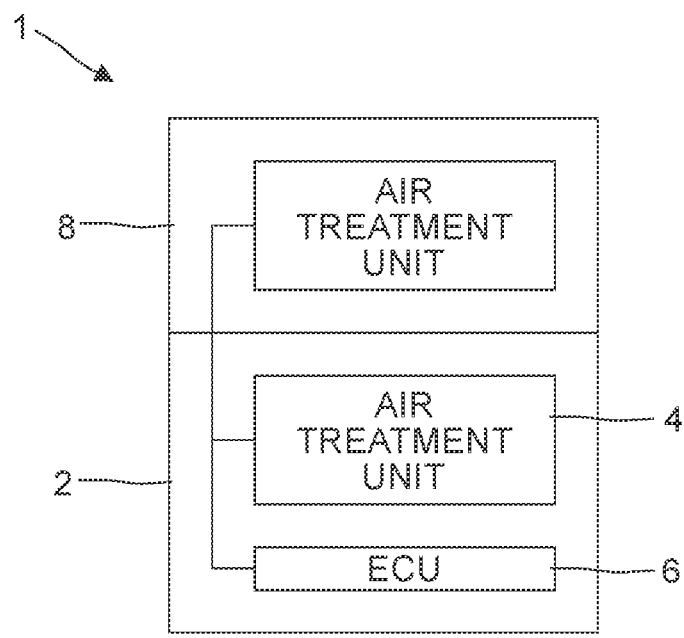
FIG. 1 is a representation of a structure of a room-air treatment system according to a first embodiment.

FIG. 1 is a representation of the structure of a room-air treatment system 1 according to a first embodiment. The room-air treatment system 1 has a basic module 2 with a first air-treatment unit 4 and a control device 6 for controlling the first air-treatment unit 4. Apart from the basic module 2, the room-air treatment system 1 has at least one second air-treatment unit 8 according to the first embodiment. Preferably, several second air-treatment units 8 can be placed on top of each other.

In the room-air treatment system 1 according to the first embodiment, the control device 6 of the basic module 2 is configured to control both the first air-treatment unit 4 as well as the at least one second air-treatment unit 8. The at least one second air-treatment unit 8 can be connected electrically (mechanically and/or electrically) to the first air-treatment unit 4.

Figure 2:
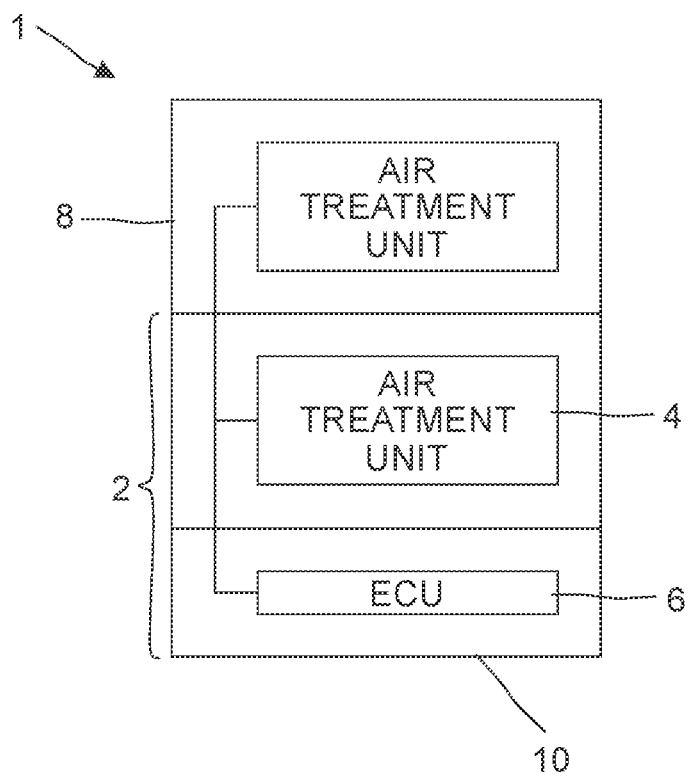
FIG. 2 is a representation of a structure of a room-air treatment system according to a modified first embodiment.

Furthermore, in the room-air treatment system 1 according to the first embodiment, the control device 6 can be integrated into the first air-treatment unit 4. Alternatively, the control device 6 can also be integrated in a separate control unit, in particular a socket unit 10 that can be coupled with the first air-treatment unit 4. FIG. 2 shows the structure of a room-air treatment system 1 according to a modification of the first embodiment, when the control device 6 is integrated into the socket unit 10. The socket unit 10 with the integrated control device 6 can be coupled (mechanically and/or electrically) with the first air-treatment unit 4 and the control device 6 controls the first air-treatment unit 4, and the at least one second air-treatment unit 8. When the control device 6 is integrated into the socket unit 10, the first air-treatment unit 4 and the second air-treatment unit 8 can have identical designs and configurations.

In the room-air treatment system 1 according to the first embodiment, a treatment capacity of the room-air treatment system 1 can simply be controlled by a number of the used second air-treatment units 8 (in addition to the first air-treatment unit 4). The number of second air-treatment units 8 used increases with the size of the room in which the room-air treatment system 1 is used to improve the room air.

Alternatively, the treatment capacity can also be controlled by a rotational speed of a fan wheel of the first air-treatment unit 4 and a rotational speed of a fan wheel of the at least one second air-treatment unit 8. In this case, an additional fan wheel stepper motor, which provides a target rotational speed on the fan wheel, is mounted on the fan wheel of the first air-treatment unit 4 and on the fan wheel of the at least one second air-treatment unit 8. The rotational speed of the fan wheel of the first air-treatment unit 4 and the rotational speed of the fan wheel of the at least one second air-treatment unit 8 can be determined directly by a user in a first operating mode, or can be determined in a second operating mode by comparing an actual value of the respective room-air parameter detected by an environmental sensor installed in the first air-treatment unit 4 and/or in the at least one second air-treatment unit 8 with a target value determined by the user. The control device 6 can control all air-treatment units 4 and 8 synchronously or individually.

In order to set the rotational speed of the fan wheel of the first air-treatment unit 4 and/or the rotational speed of the fan wheel of the at least one second air-treatment unit 8, an interface unit can be provided on the control device 6 in the first operating mode. This interface unit can be configured to work mechanically, electrically or in another way. For example, the rotational speed of the fan wheel of the first air-treatment unit 4 and/or the rotational speed of the fan wheel of the at least one second air-treatment unit 8 can be adjusted by the user directly via a potentiometer or operating panel 11 (see FIG. 5A) attached to the control device 6 or the socket unit 10. Alternatively, the interface unit can also be connected to an additional external control device, via which the rotational speed of the fan wheel of the first air-treatment unit 4 or the rotational speed of the at least one second air-treatment unit 8 can be adjusted. For example, this external control device can be a mobile terminal device, such as a smartphone with an application installed on it, and can communicate with the control device 6 via a Bluetooth connection, for example.

Analogously, in the second operating mode, the target value for determining the rotational speed of the first air-treatment unit 4 or of the at least one second air-treatment unit 8 can also be determined via a mechanical, electrical or otherwise designed interface unit.

In the room-air treatment system 1 according to the first embodiment, the control device 6 of the first air-treatment unit 4, which may be integrated in the first air-treatment unit 4 or in the socket unit 10, can directly control the at least one second air-treatment unit 8. Alternatively, the at least one second air-treatment unit 8 can also be controlled indirectly via the first air-treatment unit 4.

Figure 3:
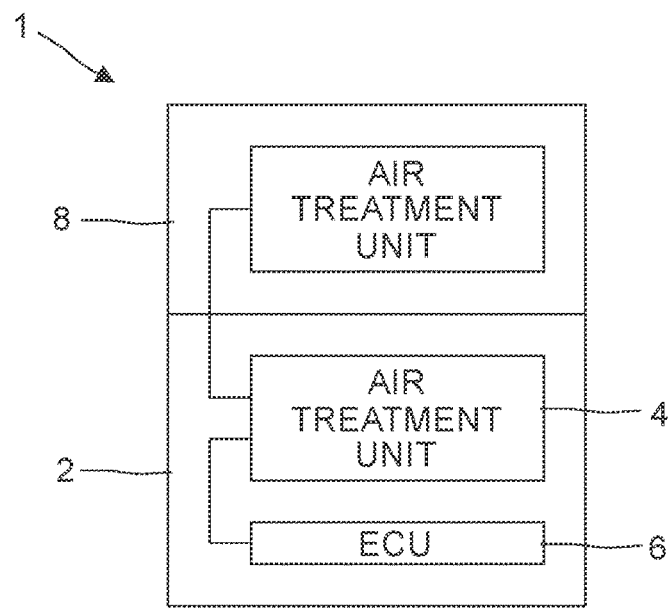
FIG. 3 is a representation of a structure of the room-air treatment system according to a modified first embodiment.

FIG. 3 is a representation of a modified structure of the room-air treatment system 1 according to the first embodiment. Analogous to the first embodiment, the room-air treatment system 1 has the basic module 2 with the first air-treatment unit 4 and the control device 6 for controlling the first air-treatment unit 4. Apart from the basic module 2, according to the modified first embodiment the room-air treatment system 1 has the at least one second air-treatment unit 8, which can be coupled with the basic module 2.

In the room-air treatment system 1 according to the modified first embodiment, the control device 6 of the basic module 2 is configured to directly control the first air-treatment unit 4. Furthermore, the control device 6 in the room-air treatment system 1 according to the modified first embodiment is configured to control the at least one second air-treatment unit 8 indirectly via the first air-treatment unit 4.

Figure 4:
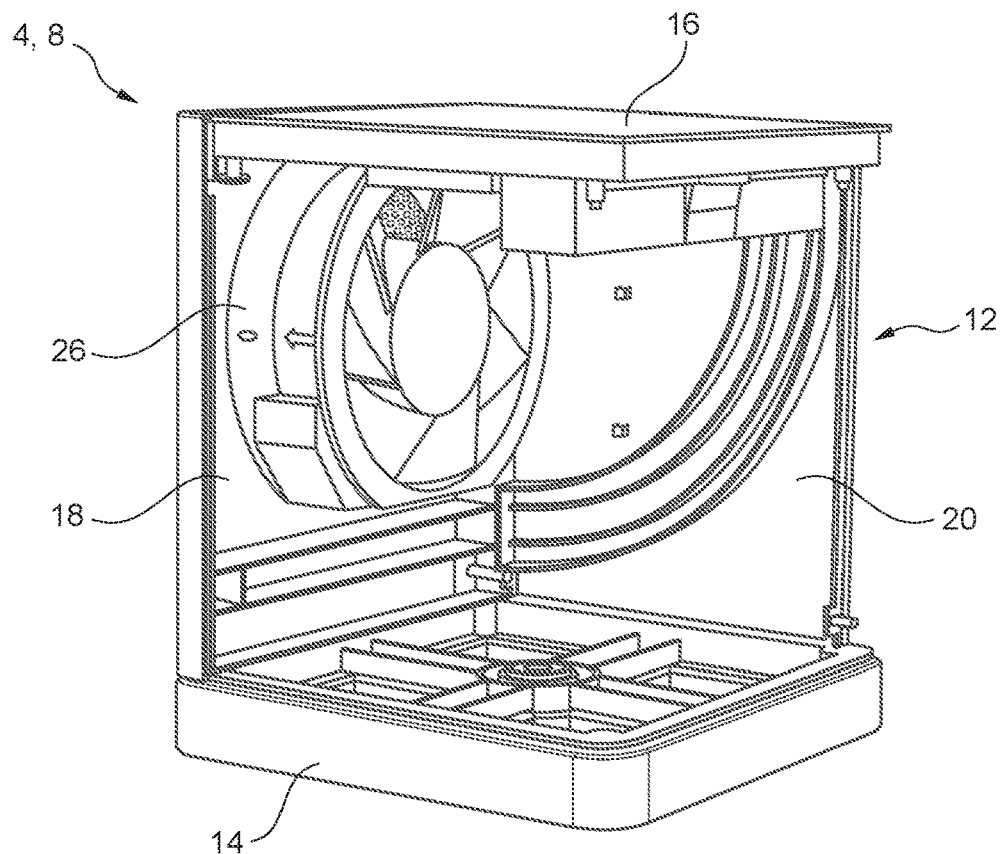
FIG. 4 is an exemplary representation of a structure of an air-treatment unit used in the embodiments described below.

FIG. 4 is an exemplary representation of a structure of the first air-treatment unit 4 and the at least one second air-treatment unit 8. In the following, the first air-treatment unit 4 and the at least one second air-treatment unit 8 are generally referred to as "the air-treatment unit", unless there is explicitly a difference between the first air-treatment unit 4 and the at least one second air-treatment unit 8.

Figure 5A:
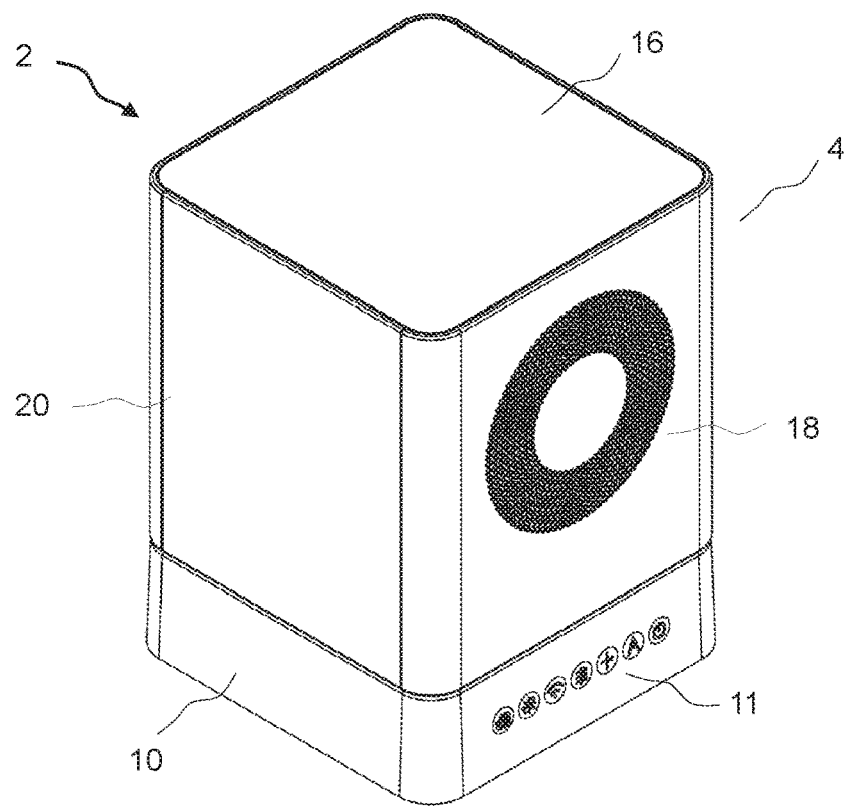
FIGS. 5A and 5B are perspective views of an exemplary air-treatment unit used in the embodiments described below.
Figure 5B:
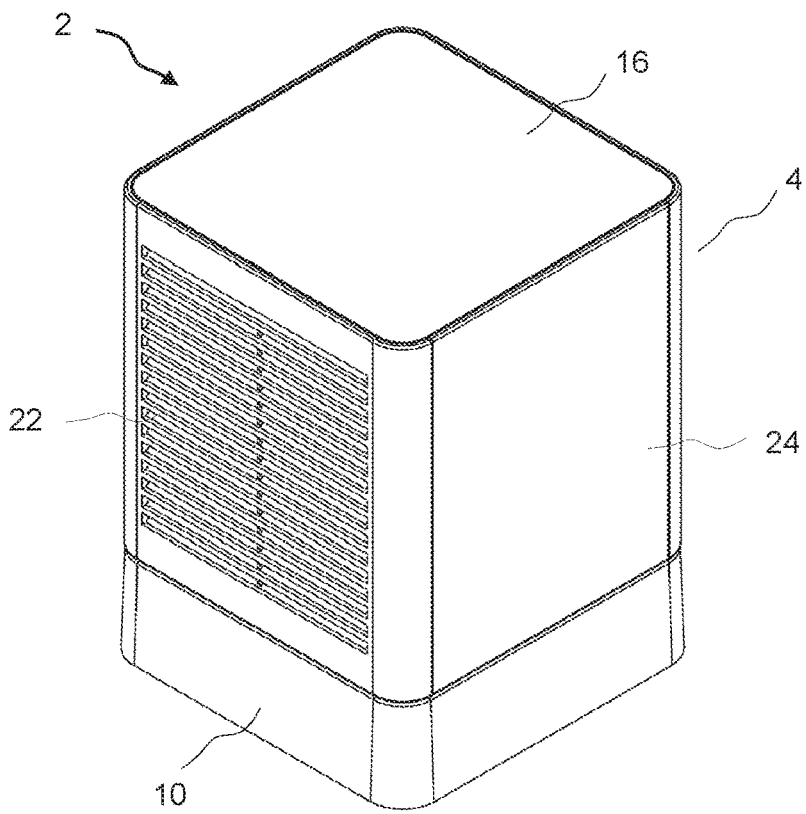

FIGS. 5A and 5B are perspective views of the air-treatment unit. The air-treatment unit comprises a housing 12 with a rectangular bottom plate 14, a rectangular top plate 16 opposite the bottom plate 14 in a height direction of the air-treatment unit, and four side walls 18, 20, 22, 24 extending vertically between the bottom plate 14 and the top plate 16 (side walls 22, 24 not shown in FIG. 3). The bottom plate 14, the top plate 16 and the four vertically arranged side walls 18, 20, 22, 24 thus form a hollow space in which a filter unit (not shown in FIG. 3) is arranged. The filter unit is an example of an air-treatment component and the bottom plate 14 is an example of the socket unit 10 in which the control device 6 is integrated.

Furthermore, one of the four side walls 18, 20, 22, 24 is formed to be air-permeable, and an axial fan 26 is provided on an inside of the air-permeable side wall to draw ambient air from outside of the air-treatment unit to thus form an air inlet. Hereby, the axial fan 26 is an example of the fan wheel of the first air-treatment unit 4 or the fan wheel of the at least one second air-treatment unit 8 and provides an air capacity of 300 m$^3$ per hour in the room-air treatment system according to the first embodiment. Alternatively, the fan wheel of the first air-treatment unit 4 and the fan wheel of the at least one second air-treatment unit 8 can also be designed as a radial fan or another pump device. At least one of the three other side walls 18, 20, 22, 24 is also formed to be air-permeable to form an air outlet through which the drawn-in air is blown out again.

During operation, the ambient air is drawn in from outside the air-treatment unit via the air inlet and the axial fan 26 and supplied to the filter unit on the inside of the air-treatment unit. After flowing through the filter unit, the filtered, drawn-in air is blown out again via the air outlet to the outside of the air-treatment unit as described above.

In this embodiment, the filter unit as an example of the air-treatment component comprises a fine particulate filter for filtering respirable particulate matter particles and/or an activated carbon filter for purifying the air of odors, chemical pollutants and cigarette smoke. Alternatively, the air-treatment component can also include components for humidifying ambient air, cooling ambient air, heating ambient air, or a combination of the components for filtering, humidifying, cooling, and heating ambient air.

Figure 6:
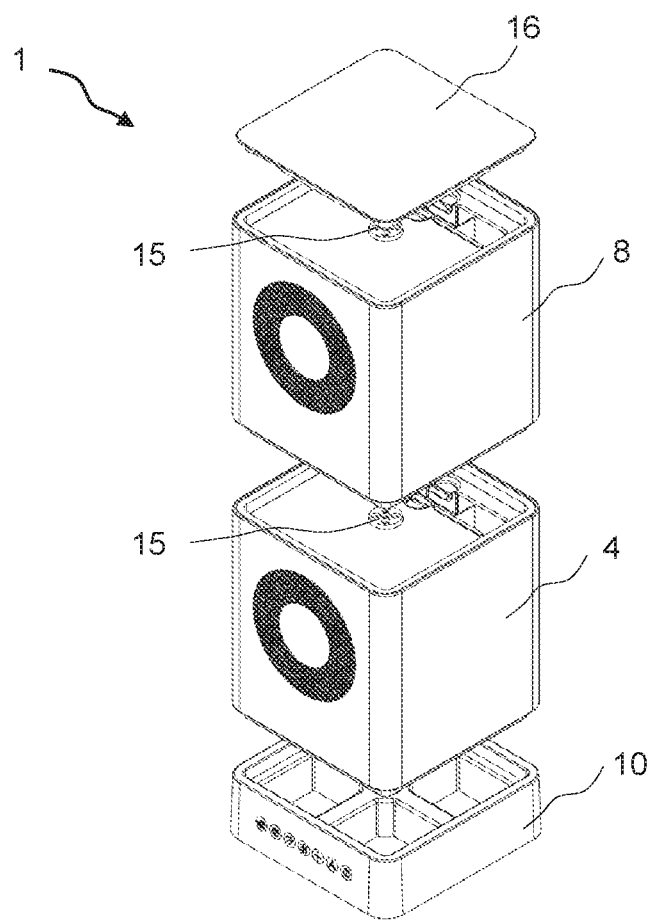
FIG. 6 is an exploded view of the exemplary room-air treatment system used in the embodiments described below.

FIG. 6 is an exploded view of the room-air treatment system 1 according to the first embodiment. In addition, the first air-treatment unit 4 and the at least one second air-treatment unit 8 in this embodiment each contain at least one (electrical) coupling element 15 in the region of the top plate 16 and at least one (electrical) coupling element 13 (not shown in FIG. 7) in the region of the bottom plate 14. In this configuration example, the at least one coupling element 15 located in the region of the top plate 16 of the first air-treatment unit 4 is configured to contact the at least one coupling element 13 located in the bottom plate 14 of the second air-treatment unit 8 and to electrically or by signaling technique couple the first air-treatment unit 4 and the second air-treatment unit 8 to each other.

As can be seen from FIG. 6, the coupling elements 13 and 15 are located centrally and the electrical contacts are designed in such a way that the air-treatment units 4 and 8 can be oriented to each other as desired (in 90° steps).

Apart from the electrical coupling via the coupling element 13 in the region of the bottom plate 14 and the coupling element 15 in the region of the top plate 16, the first air-treatment unit 4 and the at least one second air-treatment unit 8 as well as the first air-treatment unit 4 and the socket unit 10 can each be mechanically connected to each other via a fitting connection. A circumferential edge is formed on the bottom side of the second air-treatment unit 8 and on the bottom side of the first air-treatment unit 4, said edge engaging in each case with a circumferential rim formed on the upper side of the first air-treatment unit 4 and on the upper side of the socket unit 10 and thus aligns and laterally surrounds the air-treatment units 4, 8 and the socket unit 10 with respect to each other, so that the air-treatment units 4, 8 and the socket unit 10 stacked on top of each other do not shift relative to each other. Mechanical coupling (form closure) between the air-treatment units 4, 8 also allows any orientation.

The upper side of the uppermost second air-treatment unit 8, on top of which no further air-treatment unit 8 is to be placed, can be closed with a top plate or a cover 16 in order to cover the interior, in particular the electrical coupling element 15.

In order to increase the treatment capacity, the second air-treatment unit 8 can be stacked above the first air-treatment unit 4 in the height direction, whereby the first air-treatment unit 4 and the second air-treatment unit 8 together with the socket unit 10 form the room-air treatment system 1.

Figure 7A:
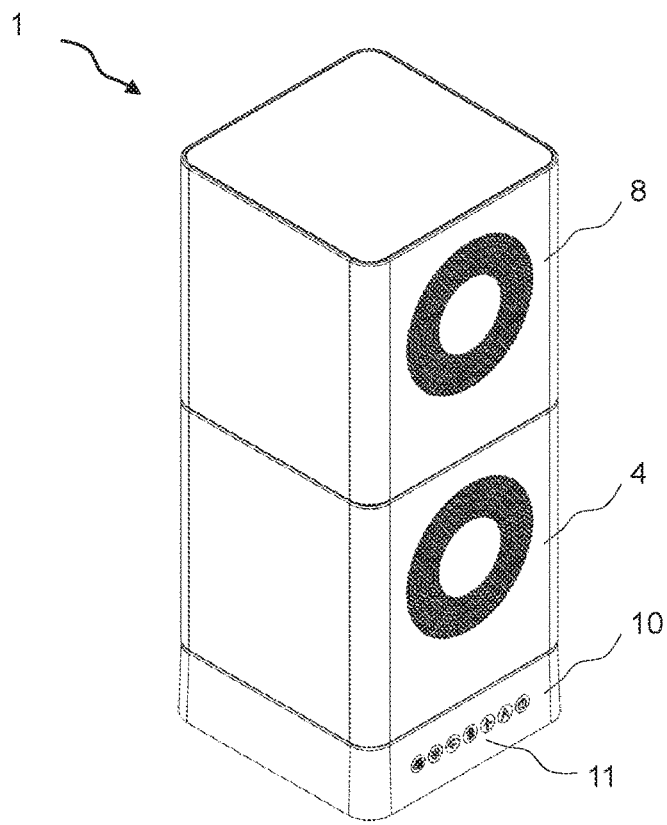
FIGS. 7A and 7B are perspective views of an exemplary room-air treatment system used in the embodiments described below with a basic module and a second air-treatment unit.
Figure 7B:
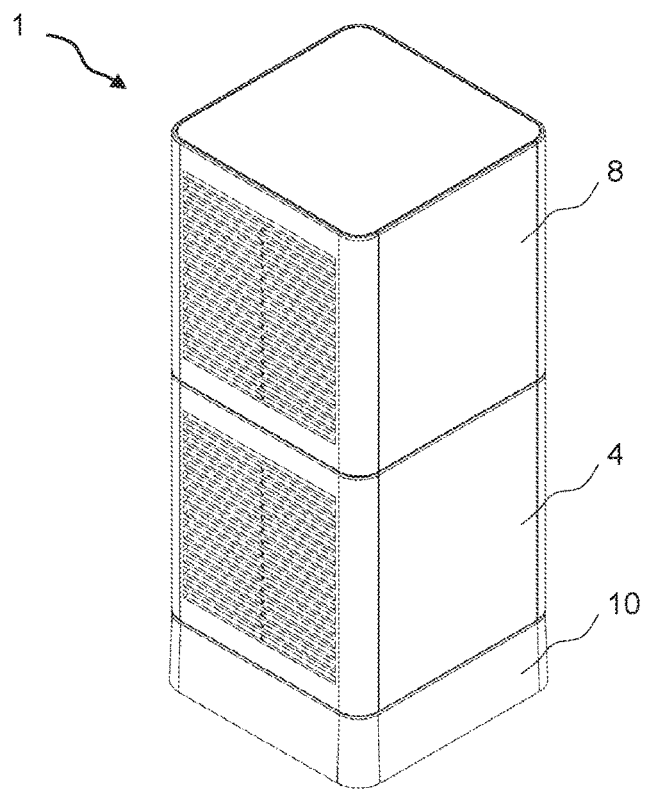

FIGS. 7A and 7B are perspective views for a case in which a second air-treatment unit 8 is arranged above the basic module 2 including the first air-treatment unit 4 and the socket unit 10 and together form the room-air treatment system 1.

Furthermore, the at least one coupling element 15 on the top plate 16 of the second air-treatment unit 8 can additionally be coupled with the at least one coupling element 13 on the bottom plate 14 of a further second air-treatment unit 8. In other words, to further increase the treatment capacity, several second air-treatment units 8 can be arranged above the first air-treatment unit 4 in the height direction on top of each other.

As already explained, the coupling elements 15 on the top plate 16 and the coupling elements 13 on the bottom plate 14 of the air-treatment units 4, 8 are arranged symmetrically. Due to the symmetric arrangement of the coupling elements as well as the symmetric design of the air-treatment units, the individual air-treatment units 4, 8, when arranged one on top of each other, can be rotated about their longitudinal axis. In other words, when the coupling elements 13, 15 are arranged symmetrically and several air-treatment units are stacked on top of each other, the air inlets or air outlets of the individual air-treatment units can be rotated by 90°, 180° or 270° to each other, for example, and thus distribute the filtered air better and more evenly in the room.

Alternatively, coupling elements can also be provided on opposite side walls as seen in the width direction of the air-treatment unit. The at least one coupling element on the side wall of the first air-treatment unit 4 is connected to the at least one coupling element on the side wall of the second air-treatment unit 8, whereby the first air-treatment unit 4 and the second air-treatment unit 8 are mechanically coupled to each other in the width direction. The first air-treatment unit 4 and the second air-treatment unit 8 thus form the room-air treatment system 1.

In addition, the at least one coupling element on the side wall of the second air-treatment unit 8 can also be coupled to the at least one coupling element on the side wall of a further second air-treatment unit 8. In other words, to further increase the treatment capacity, several second air-treatment units 8 can be arranged next to the first air-treatment unit 4 in the width direction in a coupled state.

When the first air-treatment unit 4 and the at least one second air-treatment unit 8 as well as the second air-treatment units 8 are electrically coupled to each other, it is possible that the coupling partners exchange information without physical contact.

Second Embodiment

Figure 8:
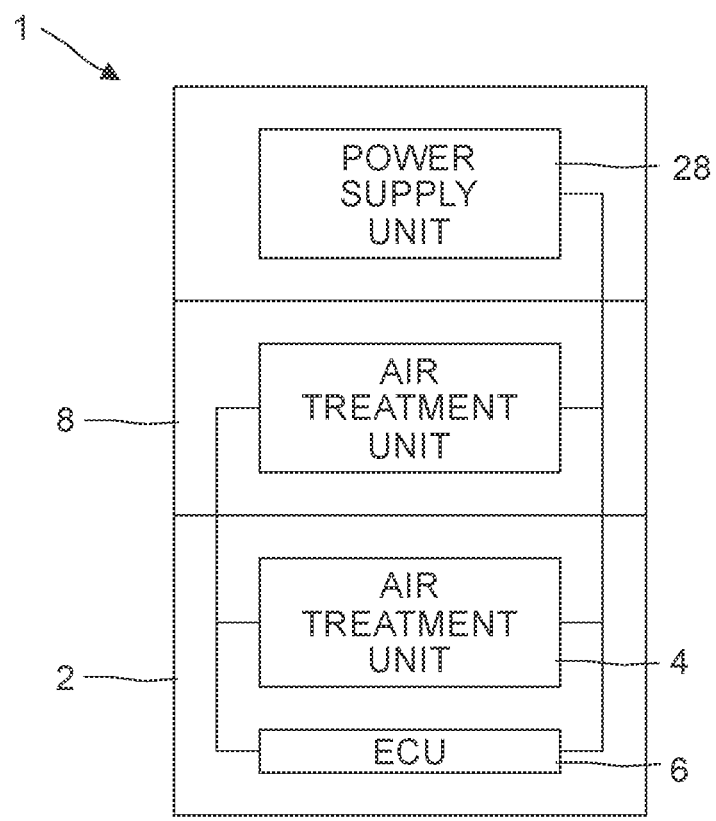
FIG. 8 is a schematic representation of a room-air treatment system according to a second embodiment.

FIG. 8 is a schematic representation of a room-air treatment system 1 according to a second embodiment. The room-air treatment system 1 according to the second embodiment has a basic module 2 with a first air-treatment unit 4, at least one second air-treatment unit 8, and a power supply unit 28.

In the room-air treatment system 1 according to the second embodiment, the basic module 2, the first air-treatment unit 4 and/or the at least one second air-treatment unit 8 have a solar-cell unit on at least one outer side surface. The solar-cell unit is configured so that it can be coupled to the basic module 2, the first air-treatment unit 4, and/or the at least one second air-treatment unit 8 via a coupling element. In the coupled state, the solar-cell unit supplies power to the air-treatment unit coupled to the solar-cell unit.

Alternatively, the solar-cell unit can also be configured to supply power to all units of the room-air treatment system 1 according to the second embodiment. In other words, in the room-air treatment system 1 according to the second embodiment, the solar-cell unit is coupled to the first air-treatment unit 4 or to at least one of the second air-treatment units 8, and supplies power to the other air-treatment units forming the room-air treatment system 1 via this air-treatment unit coupled to the solar-cell unit.

In a case in which at least one second air-treatment unit 8 is arranged above the basic module 2 or the first air-treatment unit 4, respectively, and the solar-cell unit is coupled to the uppermost second air-treatment unit 8, an upper side of the uppermost second air-treatment unit 8 may additionally be equipped with a solar-cell unit.

The solar-cell unit is here an example of a power supply unit 28. Alternatively, mobile energy sources such as batteries (Ni—Cd, alkali-manganese) or accumulators (lithium ions) can also be used as power supply unit 28.

The invention according to the present disclosure was described using exemplary configuration examples, but is not limited to this. Furthermore, the invention can be changed and modified without deviating from the core of the invention.

The invention claimed is:

1. A room-air treatment system comprising:
a basic module comprising a first air-treatment unit and a control device;
at least one second air-treatment unit; and
coupling elements for coupling the basic module to the at least one second air-treatment unit; wherein
the control device is integrated into a separate control unit coupled to the first air-treatment unit and/or the at least one second air-treatment unit for controlling both the first air-treatment unit and the at least one second air-treatment unit;
the first air-treatment unit and the at least one second air-treatment unit each comprise at least one air outlet being arranged perpendicular to a stacking direction, in which the first air-treatment unit and the at least one second air-treatment unit are to be coupled; and
the coupling elements are symmetrically designed to vary the orientation of the first air-treatment unit and the at least one second air-treatment unit relative to one another in a coupled state by 90°, 180° or 270°, such that treated air is distributed better and more evenly inside a room.

2. The room-air treatment system according to claim 1, wherein the control device controls the at least one second air-treatment unit indirectly via the first air-treatment unit.

3. The room-air treatment system according to claim 1, wherein a treatment capacity of the room-air treatment system is adjustable via a number of the second air-treatment units or by individual controlling of the first air-treatment unit and the at least one second air-treatment unit.

4. The room-air treatment system according to claim 1, wherein the first air-treatment unit and the at least one second air-treatment unit comprise at least one component for filtering, cooling, and/or humidifying the ambient air.

5. The room-air treatment system according to claim 1, wherein the first air-treatment unit and the at least one second air-treatment unit are configured to be mechanically and/or electrically coupled to each other.

6. The room-air treatment system according to claim 1, further comprising a power supply unit configured to be coupled to the basic module and/or the at least one second air-treatment unit for supplying power to individual or all units of the room-air treatment system.

7. The room-air treatment system according to claim 6, wherein the power supply unit comprises at least one outer surface side and has one or more solar cells on said at least one outer surface side.

8. The room-air treatment system according to claim 1, wherein the control device is operable by manual input or via an external device via a wireless radio link.

9. The room-air treatment system according to claim 1, wherein the separate control unit is integrated into a control socket unit coupled to the first air-treatment unit.

10. The room-air treatment system according to claim 1, wherein the coupling elements are electrical coupling elements that are centered and axially aligned to permit stacking of the first air-treatment unit on the at least one second air-treatment unit in a plurality of different orientations relative to the at least one second air-treatment unit.

* * * * *